United States Patent [19]

Audesse et al.

[11] 4,390,935
[45] Jun. 28, 1983

[54] PROJECTION UNIT WITH SEPARABLE LAMP CAPSULE AND MEANS FOR EJECTING SAME

[75] Inventors: Emery G. Audesse, Beverly, Mass.; George B. Kendrick; Pratap P. Chavan, both of Lexington, Ky.

[73] Assignee: GTE Products Corporation, Stamford, Conn.

[21] Appl. No.: 253,332

[22] Filed: Apr. 13, 1981

[51] Int. Cl.³ ............................................. F21V 7/00
[52] U.S. Cl. ................................... 362/306; 362/296; 362/294; 362/350; 362/226
[58] Field of Search ............... 362/16, 72, 83, 95, 362/226, 257, 294, 296, 306, 317, 341, 350, 362, 373, 382, 396, 433, 434, 435, 457, 458; 313/113, 318, 49, 51, 222; 352/198, 203; 354/141, 143, 148

[56] References Cited

U.S. PATENT DOCUMENTS

| | | | |
|---|---|---|---|
| 3,314,331 | 4/1967 | Wiley | 362/296 X |
| 3,502,864 | 3/1970 | Wagner | 362/306 |
| 3,621,232 | 11/1971 | Hough et al. | 362/306 X |
| 3,639,750 | 2/1972 | Anthonijsz | 362/226 |
| 3,789,212 | 1/1974 | Wagner | 362/306 |
| 4,156,901 | 5/1979 | Haraden et al. | 362/296 |
| 4,219,870 | 8/1980 | Haraden et al. | 362/350 X |
| 4,280,173 | 7/1981 | Bradley et al. | 362/294 |
| 4,281,363 | 7/1981 | Mecone et al. | 362/294 |

FOREIGN PATENT DOCUMENTS

| | | | |
|---|---|---|---|
| 2454050 | 12/1979 | France | 362/341 |
| 6603641 | 9/1967 | Netherlands | 362/296 |
| 2043621A | 2/1980 | United Kingdom . | |

Primary Examiner—David H. Brown
Assistant Examiner—John E. Griffiths, Jr.
Attorney, Agent, or Firm—Lawrence R. Fraley

[57] ABSTRACT

A projection unit for use within a slide or film projector or a microfilm viewer. The unit comprises a U-shaped metallic holder, a socket attached to or forming part of the holder's rear upstanding segment, a glass reflector secured to the holder's front segment such that its forward opening aligns with an aperture in the front segment, a tungsten-halogen lamp removably located within the socket and not engaging any of the interior surfaces of the reflector, and an ejector (metal arm member) for engaging the sealed end of the lamp and ejecting it out through the glass reflector's forward opening. Replacement of the lamp is thus possible without replacing the glass reflector.

19 Claims, 4 Drawing Figures

PROJECTION UNIT WITH SEPARABLE LAMP CAPSULE AND MEANS FOR EJECTING SAME

DESCRIPTION

1. Technical Field

The invention relates to projection units for use in projection systems such as microfilm viewers and slide and movie projectors.

2. Background

In many projection units which include a preformed glass reflector and projection lamp capsule, (e.g., tungsten halogen) therein, the lamp capsule is retained in alignment with the reflector by employing a suitable cement, e.g., sauereisen, within the reflector and about the lamp's sealed end. Examples of such arrangements are shown in U.S. Pat. Nos. 3,314,331 (Wiley) and 3,639,750 (Anthonijsz). Use of cement or a similar permanent-type bonding agent prohibits separation of the lamp capsule and reflector in the event that replacement of either of these components is necessary. In almost all cases, it is only the incandescent lamp capsule which fails and needs replacement. The aforementioned permanent bond between lamp and glass reflector was believed essential to assure precise alignment between said components and between these members and other elements (e.g., film gate, projection lens) within the overall system. Alignment between the reflector and lamp was usually achieved using a precisioned instrument whereupon the assembled unit was ready for insertion within a respective socket holder arrangement, such as shown in U.S. Pat. No. 3,789,212 (Wagner). This latter positioning is usually accomplished by the projector's operator.

Mandatory replacement of both lamp and glass reflector has therefore resulted in unnecessary waste of material which in turn has added appreciably to the overall cost of operating such systems.

The projection unit of U.S. Pat. No. 4,156,901 (Haraden et al.) was designed to eliminate the above undesired requirement by providing a retention member which is removable from within the reflector yet which also assures positive alignment of the unit's incandescent lamp with the reflector when said lamp is positioned therein. The retention member is secured to the lamp's sealed end and may comprise a metallic "can", a preformed component of insulative material such as ceramic, or a combination of both. One particular disadvantage with the unit of U.S. Pat. No. 4,156,901 was the requirement for providing grooves, slots, etc. within the reflector's elongated neck portion to accommodate the retention member, which also in turn required protruding tabs or similar items for being finally positioned within these grooves. Yet another disadvantage of the unit of 4,156,901 was that the reflector opening to accommodate the unit's retention member had to be relatively large, thus reducing the available reflective surface area of the unit's glass reflector component.

The projection unit described in U.S. Pat. No. 4,219,870 (Haraden et al.) was designed as an improvement over the aforedescribed unit of U.S. Pat. No. 4,156,901 by providing means whereby the retention member having the sealed end of the lamp therein may be removed from the front, concave reflecting portion of the glass reflector. The method of removal of these components in U.S. Pat. No. 4,156,901 was through the rear (neck) opening of the reflector. This latter requirement necessitated provision of the described large opening, thus reducing the unit's total forward output. Rearward removal was also made more difficult in the complete system due to the typically limited accessibility in this region of the system. In U.S. Pat. No. 4,219,870, the resulting unit also required a metallic "can" on the end of the lamp capsule, as well as the foregoing grooves, slots, etc. within the opening in the reflector's neck. This opening was substantially smaller, however, than that in U.S. Pat. No. 4,156,901 but in order to accomplish this it was necessary to provide a second, external springlike retention member, as well as grooves in the neck's external surface to accommodate this second member.

In addition to the above, there are described several versions of various front-loading projection units in Ser. No. 212,398, Ser. No. 212,469, and Ser. No. 212,470, all of which are assigned to the same assignee as the instant invention. All of these units require provision of slots or grooves within the glass reflector's neck portion in order to effect proper alignment of the lamp capsule therein. In addition, all require utilization of a metallic "can" or similar component secured to the end of the capsule (about the sealed end of the lamp itself) which must be inserted within the reflector's neck. As also in the case of the above units, this "can" member includes protuberances or similar projecting portions in order to align the capsule, said protuberances being slidably positioned within the corresponding grooves or slots of the reflector. Still further, the above units require some additional means of accomplishing capsule securement, such as a threaded nut, wireform, or locking cantilever spring member.

Yet another embodiment of a projection unit having a separable lamp capsule is described in Ser. No. 217,627, which is also assigned to the same assignee as this instant invention. In this unit, the capsule also includes an attached metallic "can" in addition to a pair of projecting flanges which slidably engage both the neck of the reflector and upstanding rear part of the unit's metallic U-shaped holder. Once the capsule is inserted, it is necessary in Ser. No. 217,627 to thereafter attach the preferred socket component, which itself constitutes a separate part of the system. It was thus necessary in this unit to precisely locate the flange portions relative to the capsule's filament structure in order to provide proper filament orientation within the reflecting region of the reflector. Such a procedure is understandably both costly and time-consuming.

It is believed, therefore, that a projection unit which provides for facile separation of the lamp component from within the unit's reflector and/or socket member without the foregoing disadvantages of the units described above would constitute a significant advancement in the art.

DISCLOSURE OF THE INVENTION

It is, therefore, a primary object of this invention to enhance the projection unit art by providing a projection unit which provides for precise alignment of the lamp component therein relative to the unit's reflector, facile removal (separation) of only the lamp from the unit should replacement thereof be necessary, and sound contact between the lamp and the unit's socket, which in turn assures a positive connection to the electrical circuitry of the projection system in which the invention is eventually utilized.

In accordance with the primary aspect of the invention, there is provided a projection unit which comprises a holder, a socket positioned on or forming part of the holder, a reflector located within the holder, a lamp removably positioned within the socket and aligned within the unit such that its envelope portion is located substantially within the concave reflecting region of the reflector and its sealed end portion is located substantially within the rear opening of the reflector, and means for ejecting the lamp from the holder whereby the lamp will pass through the reflector's forward aperture. The holder includes both front and rear upstanding portions, the front portion defining a reference surface thereon such that when the reflector engages the front surface, it can therefor be properly aligned with the holder's aperture, and the lamp can be thereafter precisely oriented within the holder in precise relation to the front reference surface by virtue of the lamp's lead-in wires engaging a second reference surface defined within the socket and located at a predetermined, fixed distance from the front surface.

BEST MODE FOR CARRYING OUT THE INVENTION

For a better understanding of the present invention together with other and further objects, advantages and capabilities thereof, reference is made to the following disclosure and appended claims in connection with the above-described drawings.

Figure 1:
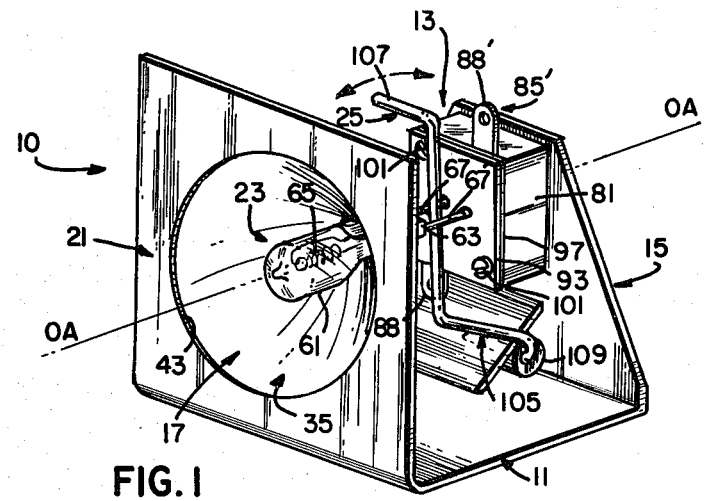
FIG. 1 is a perspective view of a projection unit in accordance with a preferred embodiment of the invention.
Figure 2:
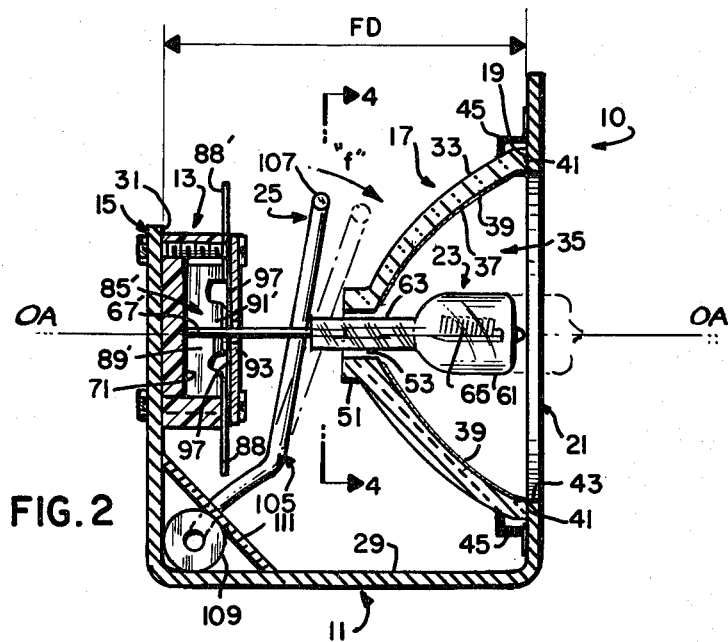
FIG. 2 is a slightly enlarged side elevational view, partly in section, of the unit shown in FIG. 1.

With particular reference to FIGS. 1 and 2, there is illustrated a projection unit 10 in accordance with a preferred embodiment of the invention. Unit 10 includes a holder 11, a socket 13 which is located on a rear upstanding portion 15 of holder 11 or forming a part thereof, a reflector 17 located within the holder and against a forward reference surface 19 of a forward or front upstanding portion 21 of holder 11, a lamp 23 removably located within socket 13, and an ejection means 25 for providing facile removal of lamp 23 from socket 13 through the forward portion of reflector 17.

Holder 11 is preferably metallic (e.g., steel or aluminum) and of one piece construction. In one example of the invention, holder 11 was produced from a single strip or sheet of 0.0625 inch thick steel. Accordingly, each of the upstanding portions 15 and 21 were thereafter folded upwardly (at 90 degrees) relative to a centrally disposed base portion 29, thus resulting in the U-shaped configuration illustrated in FIGS. 1 and 2. When unit 10 is to be positioned within a suitable projection system such as a microfilm viewer, slide projector, or film projector, base portion 29 of the U-shaped holder will be suitably mounted (e.g., using screws) to a corresponding base or pedestal located within the viewer or projector. Holes or similar openings (now shown) would thus be provided within base 29 at suitable locations to facilitate this securement.

Reflector 17 is comprised of glass material and includes a concave reflecting portion 33 which in turn defines a forward, light-emitting aperture 35 through which reflected light from lamp 23 will be directed. Located on an internal surface 37 of the concave reflecting portion 33 is a reflective coating 39 which may consist of a thin metallic (e.g., aluminum) coating or a dichroic coating as typically used in known projection systems. A dichroic coating is preferred in view of its unique ability to allow infrared radiation to pass therethrough while still reflecting visible light in the direction desired. Heat dissipation is thus enhanced when using such a coating. The desired configuration (cross-section) for the reflective surface 37 is either elipsoidal or parabolic, while the configuration for the forward, light-emitting aperture 35 is annular. The concave reflecting portion 33 includes a front, planar reference surface 41 which rests against a corresponding planar, forward reference surface 19 located on upstanding portion 21 of the invention's holder component. As shown in FIG. 2, surface 41 is located on the forwardmost portion of the reflector's concave reflecting portion 33 and thus lies in a plane about the forward aperture 35. Understandably, front reference surface 41 is established at a fixed, precise location with respect to the internal configuration of the reflector's reflecting surfaces and, when located in the abutting position shown in FIG. 2, assures precise orientation of the reflector's reflecting surfaces with respect to the circular opening 43 located within the planar front upstanding portion 21 of holder 11. Reflector 17 is held against the planar surface 19 by a pair of opposed clips 45 which in turn are secured (e.g., welded) to the metallic front portion 21. This means of securement is not meant to limit the invention, however, in that once reflector 17 is precisely oriented with respect to the circular opening 43, this component can be permanently affixed using a suitable bonding cement (e.g., sauereisen). The form of retention illustrated in FIG. 2 is preferred, however, to enable more facile removal of the reflector component from the unit 10 in the event that replacement and/or repair is necessary. Such a means of retention is also preferred in that it allows the system operator to substitute other reflectors having different reflecting capabilities should such substitution be desired.

Reflector 17 is also shown in FIG. 2 as including a narrower neck or apex portion 51 which includes a relatively small, substantially rectangular opening 53 therein. Attention is also directed to FIG. 4 wherein the apex portion 51 and opening 53 are illustrated in a rear view taken along the line 4—4 in FIG. 2. Apex portion 51 is substantially shorter than corresponding portions in reflectors of the prior art for reasons stated below. Accordingly, reflector 17 can be produced at substantially less cost than such prior art components. Even further, the apex portion 51 does not require the incorporation of slots or grooves or similar indentations therein, thus further reducing manufacturing costs of the invention. This feature is deemed truly unique in view of the aforementioned requirement for providing such elements within prior art reflectors in order to assure precise alignment and/or retention of the lamp capsule component. As will be understood from the following, precision alignment of the invention's lamp 23 is readily possible without the lamp being in physical contact with any portion of the glass reflector 17. With particular attention to FIG. 2, the lamp is shown in this spaced, non-contacting relationship with regard to the invention's reflector.

Figure 3:
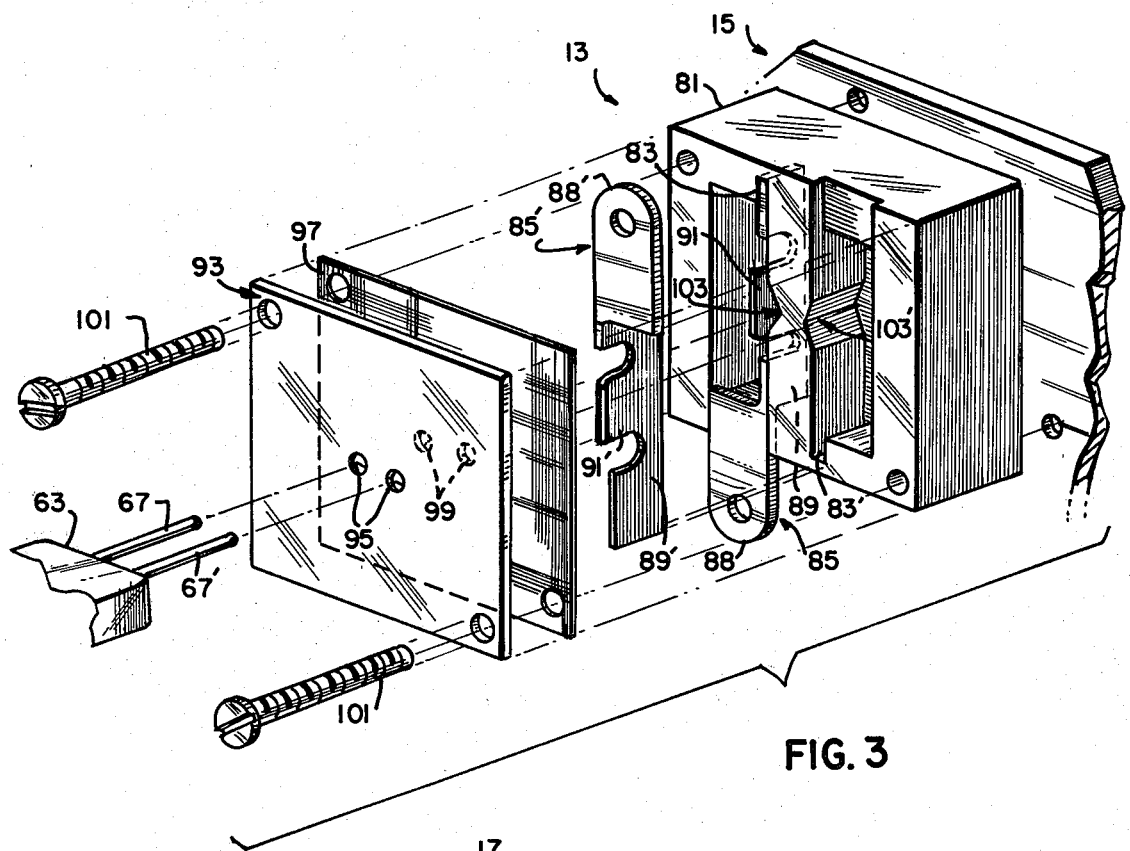
FIG. 3 is an enlarged, exploded perspective view of the socket component used in the present invention.
Figure 4:
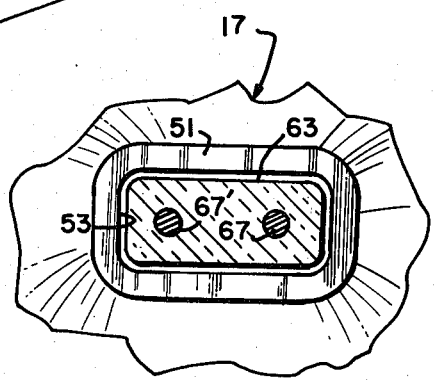
FIG. 4 is a partial, end elevational view of the invention's reflector, showing a projection lamp located therein, said view taken along the line 4—4 in FIG. 2.

Lamp 23 is of the tungsten halogen variety and includes an envelope portion 61, a press-sealed end portion 63 located immediately adjacent the envelope portion 61, a filament structure 65 (shown hidden in FIG. 2) located within the envelope portion 61, and a pair of projecting lead-in wires 67 and 67' which extend from the sealed end portion 63 in a linear, substantially parallel fashion (see also FIGS. 3 and 4). The relatively rigid lead-in wires 67, 67' are sealed within the press-sealed end portion 63 during formation thereof and thus are fixedly secured with respect to both the envelope portion 61 and sealed end portion 63, as well as the filament structure 65. These wires also lie parallel to the lamp's longitudinal axis (not shown) and on opposite sides thereof. This axis understandably passes through the center of the filament structure 65 and thus lies coincidental with the reflector's optical axis (OA—OA) when lamp 23 is fully inserted within socket 13. Understandably, each of the lead-in wires 67 and 67' is electrically joined to the filament structure 65 and serve to provide a current path thereto when the wires 67, 67' are located within the invention's socket 13 and thereafter connected to the corresponding circuitry of the system in which unit 10 is located.

Lamp 23 is oriented within unit 10 in such a manner so as to be readily removable from within the invention's socket 13 through the reflector's forward, light-emitting aperture 35 and the circular opening 43 of holder 11. This unique feature, to be described in greater detail below, the permits removal of only the lamp 23 of the invention in the event that this component fails. As stated above, it is the lamp which usually fails in such systems and therefor only needs replacement thereof. The instant invention thus assures this feature without requiring additional replacement of any of the remaining components of the invention, particularly the glass reflector 17. In addition to this feature, the invention also assures that subsequent replacement lamps of similar configuration to lamp 23 can be readily inserted in a precise orientation identical to that of its predecessor, thus assuring optimum light output from the new component. In other words, subsequent lamps of similar configuration to lamp 23 will be positioned in an identical relationship to the remaining elements of unit 10.

Lamp 23 is located within reflector 17 such that the optical axis OA—OA of the reflector passes through the center of the lamp's filament structure 65. This positioning relationship is considered necessary such that the light-emitting filament structure of lamp 23 will be precisely oriented with respect to the reflecting surfaces of reflector 17.

When lamp 23 is positioned within unit 10, the envelope portion 61 is located substantially within and therefore surrounded by the aforementioned reflecting surfaces of the reflector's concave reflecting portion and the sealed end portion 63 is spacedly located within the rear opening 53 of the reflector's narrower, apex portion 51. To assure that the lamp 23 is located at a proper depth (laterally) with respect to reflector 17, at least one of the projecting portions of the lead-in wires (67' in FIG. 2) positively engages and abuts against rear reference surface 71 defined by socket 13, which is attached to or forms part of the rear upstanding portion 15. This rear reference surface 71 is precisely oriented with respect to the aforementioned forward reference surface 19 defined by front upstanding portion 21 of the invention's holder 11. This is accomplished by positively aligning surface 71 with respect to a planar surface 31 located on the rear upstanding portion 15 of metal holder 11. Surface 31, formed on the inner part of portion 15, is precisely oriented at a fixed distance FD (FIG. 2) from the forward surface 19 on front upstanding portion 21 during the aforedescribed folding (or bending) operation. The rigidity of this component (holder 11) assures that the fixed distance will be maintained during operation of unit 10. As also shown, planar surface 31 and rear surface 71 are both parallel to forward reference surface 19 in the assembled embodiment of the invention depicted in FIG. 2. It can therefore be seen that at least one and preferably both of the projecting lead-in wires of lamp 23 are oriented within socket 13 relative to the forward reference surface 19 so as to assure the proper alignment for the invention's lamp component. It is thus seen that by precisely defining the termination (extreme end) of at lease one of the lead-in wires of lamp 23 relative to the filament structure 65, it is possible to precisely orient the filament structure along axis OA—OA when the lamp is fully inserted within unit 10. It can also be seen that the lamp of the invention maintains this fixed relationship between the termination(s) and the filament structure by providing lead-in wires of rigid configuration and positively securing these members within the press-sealed end portion 63 of the lamp. Although it has been stated that it is only necessary to precisely define the termination of one of the invention's lead-in wires with respect to the filament structure of lamp 23, it is preferred in the invention to do so with both lead-in wires 67 and 67'.

As stated, lamp 23 is of the tungsten halogen variety. Accordingly, the lamp's envelope and press-sealed end is preferably comprised of a hardglass material such as quartz or Vycor having a high melting point and low coefficient of expansion to permit wall temperatures approaching 600 degrees celsius. The corresponding filament structure (65) is comprised of tungsten, while the combustion-supporting gas within the envelope is selected from the group consisting of iodine, chlorine, bromine, or other suitable halogens. Tungsten halogen lamps are ideally suited because of their self-cleaning capabilities during operation. During operation, tungsten particles evaporate from the filament structure and collide with the respective halogen gas particles and combine chemically therewith. As a result of this chemical combination, tungsten particles are in turn deposited on the filament and the halogen gas released for subsequent combining. In one specific example, lamp 23 possessed an overall length (from tip to termination of lead-in wire) of approximately 1.500 inch. In this example, lead-in wires 67 and 67' each projected a distance of about 0.375 inch from end 63.

Other lamps which may be used in the present invention, with slight modification, include those sold as part of what are presently referred to in the industry as rim mount lamp units. Such units typically include a glass reflector having the desired lamp cemented therein. These units are presently available under such ANSI designations as BJW, EET, ELS, DZP, ENV, ELE, DNF, ELV, ERX, EKS, DNE, ENZ, BAA, EKG, ELB, EPV, and EKN. Tungsten halogen lamps as used in such combined units typically possess a wattage of between 35 and 250 watts and operate at an operating potential of between 12 and 120 volts. Understandably, the invention is not limited to these lamps alone. It is readily possible in the invention to utilize tungsten halogen lamps operational at much broader wattage ranges (e.g., between 6 and 360 watts).

With particular regard to FIG. 3, there is illustrated an exploded perspective view of socket 13 in accordance with a preferred embodiment of the invention. Socket 13 is preferably attached to or forms part of the rear upstanding portion 15 of holder 11. That is, it is possible in the invention to modify the presently shown planar configuration for rear portion 15 to include as part thereof the necessary elements (below) required for a working socket component. Understandably, if this were done it would be necessary to manufacture the rear portion 15 of an electrically insulative material and it must be therefore understood that such modification is within the scope of the invention. Socket 13 includes an electrically insulative (e.g., plastic) housing 81 having a pair of opposed slots 83 and 83' therein. Located within each of these spaced-apart slots is a metallic contact (85, 85') which is adapted for being engaged by a respective one of the projecting lead-in wires from lamp 23. The function of each contact is to therefore electrically join the respective wire to the circuitry of the projection system in which unit 10 is located. Accordingly, each contact includes an extension portion (88 or 88') which extends from the insulative housing 81 and is adapted for being electrically connected to a corresponding wire forming part of the system's circuitry. Understandably, such a wire could be soldered to the respective extending end or a female contact could be located on this end and the wire joined thereto. Each contact includes a main body segment (89 or 89') which is slidably positioned within the corresponding slot in housing 81. Each body segment (89, 89') is preferably frictionally located within the corresponding slot. As also shown in FIG. 3, each of the contacts 85, 85' are substantially similar but located within housing 81 in an opposing manner such that the extending end portions thereof project from both the top and bottom of the housing. In addition, each of the contacts 85, 85' includes a forward engaging segment (91 or 91') which engages the respective lead-in wire during insertion of lamp 23 within socket 13. Each engaging segment 91, 91' is adapted for being deflected away from the direction of insertion during lead-in wire engagement. Only one contact (85') is illustrated in FIG. 2 (for clarification purposes), said contact engaging and being electrically connected to the fully positioned lead-in wire 67'. This contact is also shown as being removed from its respective slot (83') in the exploded view in FIG. 4.

The preferred plastic material for insulative housing 81 of socket 13 is polyphenylene sulfide, a high temperature thermoplastic manufactured and sold by the Phillips Chemical Company, Bartlesville, Oklahoma, and sold under the tradename Ryton R-10. It is understood, however, that the invention is not limited to the use of a plastic material for housing 81. For example, it is possible to manufacture this component from ceramic material, thus enabling the socket to operate at substantially higher temperatures than one comprised of the aforementioned plastic. Should a plastic be utilized, however, it is preferred to position a heat deflector member 93 on the face portion of socket 13 so as to deflect heat generated by lamp 23 away from the socket. Heat deflector member 93 is preferably metallic (e.g., aluminum), and of a substantially rectangular, planar configuration as shown in FIG. 3. Located substantially centrally therein is a pair of apertures 95 of a somewhat larger diameter than the external diameters of each of the projecting lead-in wires to thus enable each wire to be located therethrough without physically contacting (and thus shorting) the metallic deflector member 93. In its final position (FIG. 2) the planar deflector member 93 is located within holder 11 between the socket's housing 81 and the rear apex portion 51 of reflector 17.

To electrically insulate the contacts 85 and 85' positioned within the insulative housing 81 from the metallic heat deflector 93, a thin sheet of insulative material 97 is positioned between and in contact with both of these components in the manner indicated in assembly in FIG. 2 and exploded in FIG. 3. Any well known electrically insulative material available in sheet form can be successfully utilized for this purpose. The sheet of insulative material 97 includes a pair of spaced apertures 99 (hidden) to accommodate the respective lead-in wires 67 and 67' during insertion thereof within socket 13. Also illustrated in FIGS. 3 is the means for attaching socket 13 to the rear upstanding portion 15 of holder 11. This means for attaching socket 13 comprises a pair of retention screws 101 which align with and are inserted through corresponding apertures 95 within the heat deflector member 93, sheet of insulative material 97, and insulative housing 81 to in turn be either screwed into the metallic rear upstanding portion 15 or to pass therethrough and be capped with a suitable retention nut.

Housing 81 of socket 13 also includes therein means for aligning the lead-in wires 67 and 67' of lamp 23 in a predetermined axial orientation within the socket while the leads are inserted therein. This alignment means comprises a pair of opposed, horizontal V-shaped grooves or indentations 103 and 103', each of which is adapted for receiving a respective one of the lead-in wires therein. Accordingly, grooves 103 and 103' are parallel and spaced apart a slightly greater distance than the parallel aligned lead-in wires. In one example of the invention, the parallel wires 67 and 67' were spaced apart a distance of 0.125 inch. The forward engaging segments 91 and 91' of each of the metallic contacts serve not only to positively engage the terminations of the lead-in wires during insertion but also to assist in directing these terminations into the receiving grooves (103, 103') of housing 81. In addition, because these forward engaging segments 91, 91' of the contacts are substantially resilient, they also function to retain each of the lead-in wires within the respective groove. It can thus be seen that when lamp 23 is fully inserted within socket 13, rotational movement by wires 67 and 67' about the central axis OA—OA of reflector 17 is substantially prohibited. In the final, fully inserted position of lamp 23, the parallel lead-in wires 67, 67' of this component preferably occupy a plane which passes through axis OA—OA and also is substantially parallel to the planar base portion 29 of holder 11. This plane is also therefore substantially perpendicular to both the forward reference surface 19 and the rear reference surface 71 and planar surface 31 of rear upstanding portion 15.

To enable the system's operator to readily remove the lamp 23 from its position within unit 10, the invention further includes an ejection means 25. Means 25 comprises an elongated arm member 105 which is pivotally oriented on holder 11 and passes upwardly therefrom between (but not contacting) the spaced-apart, parallel lead-in wires 67 and 67'. Arm member 105, when engaged along its upper end portion 107 thereof by the system's operator, can be displaced in a forward direction "f" (FIG. 2) to positively engage the end surface of the sealed end portion 63 of lamp 23 and force its removal from socket 13. As shown in FIG. 2, lamp 23 is thus ejected through the forward aperture 35 of reflector 17 as well as the circular opening 43 defined by the front upstanding portion 21 of holder 11. Ejection means 25 further includes a base component 109 of substantially cylindrical configuration which is retained against the holder (e.g., by a suitable plate member 111). The opposing end of arm member 105 is rotatably (or movably) positioned within the cylindrical base component 109 in the manner shown in FIGS. 1 and 2. Arm member 105 is preferably of a metallic material (for rigidity purposes) such as steel and may include a suitable insulative coating (e.g., braided glass) thereon to prevent possible shorting with either or both of the projecting lead-in wires 67, 67'. It is also within the scope of the invention to manufacture this component from an electrically insulative material (e.g., plastic) provided said material is capable of maintaining the desired degree of rigidity sufficient to enable lamp ejection without deformation thereof. It is understood that at no time during the above ejection does the arm member 105 cause harm (e.g., fracture) the glass press sealed end portion 63 of lamp 23. Several ejections of lamp 23 were accomplished in the instant invention without any such harm occuring.

There has thus been shown and described a new and unique projection lamp unit which provides not only for positioned alignment of the lamp therein, but also assures for facile and safe removal of the lamp should replacement thereof be desireable. As has been explained, the lamp component for use in the instant invention does not require a metallic or similar base component secured to any part thereof (particularly to the press-sealed end portion) in order to provide the desired alignment of the lamp. The invention is thus capable of being manufactured at substantially less cost than many existing units.

While there have been shown and described what are at present considered the preferred embodiments of the invention, it will be obvious to those skilled in the art that various changes and modifications may be made therein without departing from the scope of the invention as defined by the appended claims.

We claim:

1. A projection unit comprising:
   a holder including front and rear upstanding portions, said front upstanding portion defining an opening therein and including a forward reference surface thereon;
   a socket positioned on or forming part of said rear upstanding portion of said holder, said socket defining a rear reference surface thereon, said rear reference surface located at a predetermined, fixed distance from said forward reference surface on said front upstanding portion of said holder;
   a reflector located within said holder, said reflector having a concave reflecting portion defining a forward aperture and including a front reference surface thereon, and a rear apex portion defining an opening therein, said front reference surface of said reflector mating with said forward reference surface of said holder in a preestablished manner whereby said forward aperture of said reflector is aligned with said opening within said front upstanding portion;
   a lamp removably positioned within said socket and oriented in a non-contacting relationship with said reflector, said lamp including an envelope portion located substantially within said concave reflecting portion of said reflector when said lamp is positioned within said socket, a sealed end portion adjacent said envelope portion and located substantially within said opening within said rear apex portion of said reflector when said lamp is positioned within said socket, and a pair of lead-in wires located within said sealed end portion of said lamp and having portions thereof projecting from said sealed end portion, said lead-in wires electrically connected to said socket, at least one of said wires being positioned within said socket in contact with said rear reference surface of said socket when said lamp is positioned within said socket; and
   means for ejecting said lamp from said holder whereby said lamp will pass through said forward aperture of said reflector and said opening within said front upstanding portion of said holder, said means for ejecting said lamp comprising an arm member pivotally oriented on said holder, said arm member engaging said lamp to effect said ejection thereof.

2. The projection unit according to claim 1 wherein each of said forward and rear reference surfaces is substantially planar, said surfaces oriented substantially parallel to each other.

3. The projection unit according to claim 1 wherein said sealed end portion of said lamp does not include a base component thereon.

4. The projection unit according to claim 1 wherein said sealed end portion of said lamp is of substantially rectangular configuration in cross-section, and said opening within said apex portion of said reflector is of substantially rectangular configuration only slightly larger in area than said rectangular configuration of said sealed end portion.

5. The projection unit according to claim 1 wherein said holder is metallic.

6. The projection unit according to claim 5 wherein said holder is of one-piece construction and includes a base portion, each of said front and rear upstanding portions folded at an established angle with respect to said base portion.

7. The projection unit according to claim 1 wherein said lamp includes a filament structure electrically connected to said lead-in wires and oriented within said envelope portion in a fixed relationship with respect to said portions of said lead-in wires projecting from said sealed end portion of said lamp.

8. The projection unit according to claim 7 wherein said reflector includes an optical axis, said envelope portion of said lamp being located within said concave reflecting portion of said reflector such that said optical axis of said reflector passes through said filament structure.

9. The projection unit according to claim 7 wherein said lamp is of the tungsten-halogen variety.

10. The projection unit according to claim 1 wherein said sealed end portion of said lamp includes a rear surface, said arm member engaging said rear surface to effect said ejection of said lamp.

11. The projection unit according to claim 10 wherein said arm member extends upwardly from said holder and passes between said portion of said lead-in wires projecting from said sealed end portion of said lamp.

12. The projection unit according to claim 10 wherein said means for ejecting said lamp further includes a base component secured to said holder, said arm member movably oriented within said base component.

13. The projection unit according to claim 1 wherein said socket includes an electrically insulative housing secured to said rear upstanding portion of said holder, and a pair of electrical contacts spacedly located within said housing, each of said contacts being electrically connected to a respective one of said lead-in wires when said lamp is positioned within said socket.

14. The projection unit according to claim 13 wherein said insulative housing is plastic.

15. The projection unit according to claim 13 wherein said insulative housing includes means for aligning said lamp in a predetermined axial orientation within said socket when said lamp is positioned within said socket.

16. The projection unit according to claim 15 wherein said lamp includes a longitudinal axis and said means for aligning said lamp comprises a pair of spaced-apart grooves, each of said lead-in wires being positioned within a respective one of said grooves in such a manner so as to substantially prevent rotational movement of said lead-in wires with respect to said longitudinal axis of said lamp.

17. The projection unit according to claim 13 further including a heat deflector member positioned within said holder substantially between said socket and said apex portion of said reflector for deflecting heat generated by said lamp during operation thereof away from said socket.

18. The projection unit according to claim 17 wherein said heat deflector member is secured to said socket.

19. The projection unit according to claim 18 wherein said heat deflector member is metallic and of substantially planar configuration.

* * * * *